US006376256B1

(12) United States Patent
Dunnington et al.

(10) Patent No.: US 6,376,256 B1
(45) Date of Patent: Apr. 23, 2002

(54) RAPID PROCESS FOR ARRAYING AND SYNTHESIZING BEAD-BASED COMBINATORIAL LIBRARIES

(75) Inventors: Damien J. Dunnington, Neshanic Station, NJ (US); Paul B. Taylor, Glen Mills, PA (US)

(73) Assignee: SmithKline Beecham Corporation, Philadelphia, PA (US)

(*) Notice: Subject to any disclaimer, the term of this patent is extended or adjusted under 35 U.S.C. 154(b) by 0 days.

(21) Appl. No.: 09/242,606

(22) PCT Filed: Aug. 21, 1997

(86) PCT No.: PCT/US97/14730

§ 371 Date: Feb. 19, 1999

§ 102(e) Date: Feb. 19, 1999

(87) PCT Pub. No.: WO98/08092

PCT Pub. Date: Feb. 26, 1998

Related U.S. Application Data (60) Provisional application No. 60/049,339, filed on Jun. 10, 1997, provisional application No. 60/031,162, filed on Nov. 18, 1996, and provisional application No. 60/024,285, filed on Aug. 21, 1996.

(51) Int. Cl.[7] .................... G01N 33/53; G01N 33/543

(52) U.S. Cl. .................. 436/178; 436/518; 436/524; 436/527; 436/177; 422/55; 422/56; 422/57; 422/99; 422/100; 422/101; 422/104; 435/7.1; 435/287.1; 435/287.3; 209/45; 209/49; 222/1; 222/485

(58) Field of Search ................... 422/99, 100, 101, 422/55, 56, 57, 104; 435/7.1, 287.3, 287.1; 436/518, 524, 528, 527, 531, 178, 177; 209/45, 49; 222/1, 94, 485

(56) References Cited

U.S. PATENT DOCUMENTS

| 4,995,551 A | | 2/1991 | MacKay |
| 5,288,514 A | | 2/1994 | Ellman |
| 5,348,883 A | * | 9/1994 | Togawa ..................... 435/291 |
| 5,366,140 A | | 11/1994 | Koskenmaki et al. |
| 5,376,336 A | * | 12/1994 | Lubbers et al. .......... 422/82.06 |
| 5,558,732 A | * | 9/1996 | Hamon ........................ 156/99 |

(List continued on next page.)

FOREIGN PATENT DOCUMENTS

| WO | WO 94/05394 | 3/1994 |
| WO | WO 97/37803 | 10/1997 |
| WO | WO 97/40383 | 10/1997 |

OTHER PUBLICATIONS

U.S. application No. 08/637,123, filed Apr. 24, 1996.
Lam, et al., Letters to Nature, 1991, vol. 354, pp. 82–84.
Houghten, et al., Letters to Nature, 1991, vol. 354, pp. 84–86.
Zhao, et al., J. Med. Chem., 1996, vol. 39, pp. 350–352.

*Primary Examiner*—Jill Warden
*Assistant Examiner*—Kathryn Bex
(74) *Attorney, Agent, or Firm*—Wayne J. Dustman; William T. King; Charles M. Kinzig (57) ABSTRACT

A mixture of beads of uniform size from is deposited in an array by establishing discrete attachment areas each consisting either of a droplet of adhesive or a small area of a continuous adhesive layer exposed through an aperture in a mask. Beads which are trapped by the attachment areas are released either by a solvent on a vacuum manifold, or by evaporation of the adhesive, preferably by means of a vacuum centrifuge. The beads are released into capillaries, in which cleavage of attached compounds, or synthesis of new compounds, can be carried out. Also invented is the apparatus used in carrying out the invention.

5 Claims, 7 Drawing Sheets

U.S. PATENT DOCUMENTS

| | | | |
|---|---|---|---|
| 5,591,646 A | | 1/1997 | Hudson |
| 5,624,711 A | | 4/1997 | Sundberg et al. |
| 5,788,814 A | * | 8/1998 | Sun et al. ............... 204/297 R |
| 5,935,859 A | * | 8/1999 | Elliott et al. .................. 436/54 |
| 6,054,325 A | * | 4/2000 | Kedar et al. ................. 436/178 |
| 6,066,915 A | * | 5/2000 | Pepi ........................... 313/495 |
| 6,074,609 A | * | 6/2000 | Gavin et al. .................. 422/99 |
| 6,083,761 A | * | 7/2000 | Kedar et al. ................. 436/178 |

* cited by examiner

RAPID PROCESS FOR ARRAYING AND SYNTHESIZING BEAD-BASED COMBINATORIAL LIBRARIES

This is a 371 of International Application PCT/US97/04159, filed Aug. 21, 1997, which claims priority to U.S. Provisional Application No. 60/049,339, filed Jun. 10, 1997, 60/031,162, filed Nov. 18, 1996, and 60/024,285, filed Aug. 21, 1996.

FIELD OF THE INVENTION

This invention relates generally to the handling of bead-based combinatorial libraries, and more particularly to an improved process and apparatus for depositing beads in two-dimensional arrays. This invention also relates to an improved means of synthesizing combinatorial libraries in an array format.

BACKGROUND OF THE INVENTION

Synthesis of combinatorial compound libraries on bead supports is a well-established method for generating chemical diversity for screening against targets of pharmacological relevance. Such libraries may be synthesized as bulk populations or discrete sublibraries with or without identifier tags for deconvolution. In most cases each bead carries a single unique compound and is present in a mixture of beads containing other compounds. To test the beads for activity against a pharmacological target, it is desirable to separate the beads so that each bead may be individually assayed against one or more targets. The beads carrying active compounds can be identified and the structure of the compound elucidated. It is also desirable to separate the beads into arrays that are geometrically compatible with robotic screening systems, for example 12×8 arrays or other formats such as 384 or 1,536-well configurations. An alternative approach to the synthesis and evaluation of bead-based libraries is to array the beads prior to synthesis of the library components. This approach has the advantage that the synthetic history of each component is known from its position in the array, but has the disadvantage that the synthesis process itself is less facile, particularly for large libraries. A process and apparatus that can be used for either approach would represent a substantial improvement over current practice.

Current methods of bead arraying including manual picking and hydrodynamic sorting, in which beads are allowed to flow though an aperture and once detected are deposited into assay wells. Manual picking is extremely slow and tedious. Hydrodynamic methods sort in serial mode and are therefore slow and prone to clogging. Further, buoyancy variations within the bead library are known to cause problems. Therefore there is a need for a simple, rapid method for bead arraying which reliably delivers single beads, or a predetermined desired number of beads to each point in the array, which is not affected by the presence of compound on the beads, and which can be configured to suit any desirable format.

Based on the foregoing, it can be seen that there is a pressing need in the art for improvements in bead arraying equipment and methods. The principal object of this invention, therefore, is to provide an improved method for arraying beads, whether or not they have compounds attached to them. Another object of the invention is to provide an improved method for delivery of beads to a desired geometric array. It is also an object of the invention to provide an improved apparatus for bead arraying which is inexpensive, easy to use and independent of the presence and identity of compounds on the beads. It is a further object of this invention to provide an improved apparatus for synthesis of bead-based combinatorial libraries in array format, such apparatus being compatible with the manipulation of beads that already have compounds attached.

SUMMARY OF THE INVENTION

In accordance with the invention, the arraying of beads for bead-based combinatorial libraries is carried out by establishing a bead-receiving surface comprising two components: a pattern of discrete bead attachment areas, capable of holding a limited number of beads of uniform size; and an area, from which beads are free to separate, spacing the discrete bead attachment areas from one another. The limited number of beads which each bead attachment area is capable of holding can be one or more than one, and is preferably the same as that for every other bead attachment area in the pattern. A mixture of beads of uniform size is placed onto the bead-receiving surface, and, preferably by agitating the bead mixture, a predetermined number of beads from the mixture is caused to attach to each of the discrete bead attachment areas. Beads not attached to the discrete bead attachment areas are removed. Then the attached beads, which are in a pattern corresponding to the pattern of the bead attachment areas are released and deposited into any array.

In one embodiment of the invention, each discrete bead attachment area is a portion of a continuous adhesive layer exposed through an aperture in a mask. The area from which the beads are free to separate is a surface of the mask. In another embodiment, the step of establishing a bead-receiving surface is carried out by applying minute adhesive droplets to a substrate in a pattern.

The step of releasing the attached beads is preferably preceded by the step of aligning the attached beads with receptacles in an array corresponding to the pattern of bead attachment areas, and the depositing step is carried out by depositing the beads into the receptacles with which they are aligned.

Where a porous substrate is used, and the bead attachment areas are areas of adhesive on the substrate, the attached beads can be released by washing the substrate with a solvent and thereby dissolving the bead attachment areas.

In the case of beads having attached compounds representing a combinatorial library, the depositing step is preferably followed by the step of cleaving a compound from each bead by means of a reagent, while the beads remain in the receptacle. The receptacles are preferably in the form of glass capillaries arranged so that they can be simultaneously immersed into reagents in the wells of a well plate after the depositing step is carried out. Compounds can be cleaved from the beads by the reagents in the wells while the beads remain in the capillaries, and the cleaved compounds can then be tested for pharmaceutical activity.

Synthesis of chemical compounds on bead arrays can be carried out using a similar procedure. The process for synthesis of pre-arrayed libraries according to the invention is carried out by arraying blank beads into capillaries. The capillaries containing the beads are dipped into multiwell containers, each well containing a different chemical reagent. Compounds are assembled on the beads by successive transfer of the capillary into appropriate reagent plates. Once complete, the compounds are released from the beads by transfer of the capillary array into a receptacle containing cleavage reagents.

A synthesizing process in accordance with the invention comprises the steps of: establishing a bead-receiving surface comprising a pattern of discrete bead attachment areas, each capable of holding a limited number of beads of uniform size and an area from which beads are free to separate, spacing the discrete bead attachment areas from one another. Here also, the limited number of beads for each bead attachment area is preferably the same as that for every other bead attachment area in the pattern. A mixture of beads of uniform size is placed onto the bead-receiving surface, and a predetermined number of beads from the mixture is caused to attach to each of the discrete bead attachment areas. Unattached beads are removed, and the attached beads are aligned with capillaries in an array of capillaries corresponding to the pattern of bead attachment areas. The attached beads are then released and deposited into the array of capillaries. The capillaries of the array are introduced simultaneously into wells containing reagents for desired synthetic steps, and syntheses are carried out on the beads while the beads remain in the capillaries. The synthesis may be followed by washing the beads in the capillaries to remove unbound reagents, and cleaving synthesized compounds.

Another feature of the invention resides in the structure of the apparatus used in the case in which the bead attachment areas are portions of a continuous adhesive layer. The apparatus comprises a mask and substrate. The mask is preferably the floor of a tray and has parallel first and second faces and an array of apertures, each aperture extending from the first face to the second face. The apertures are of uniform size such that he number of beads that can be located abreast in each aperture is limited to a predetermined number. At least in the case in which each aperture is intended to receive only one bead, the apertures are preferably circular. The substrate is preferably a porous sheet of nitrocellulose removable from the mask, and has a face with a layer of adhesive, preferably ethylene glycol, situated against the second face of the mask and covering openings of the apertures in the second face. Thus, a predetermined number of beads, at each aperture, can be deposited in the second face. Thus, a predetermined number of beads, at each aperture, can be deposited onto, and adhere to, the adhesive layer. Means are preferably provided for holding the mask in a fixed relationship with an array of receptacles, so that beads deposited through the apertures of the mask onto the adhesive layer of the substrate can be readily aligned with the receptacles.

Various other objects, details and advantages of the invention will be apparent from the following detailed description, when read in conjunction with the drawings:

DETAILED DESCRIPTION

Figure 1:
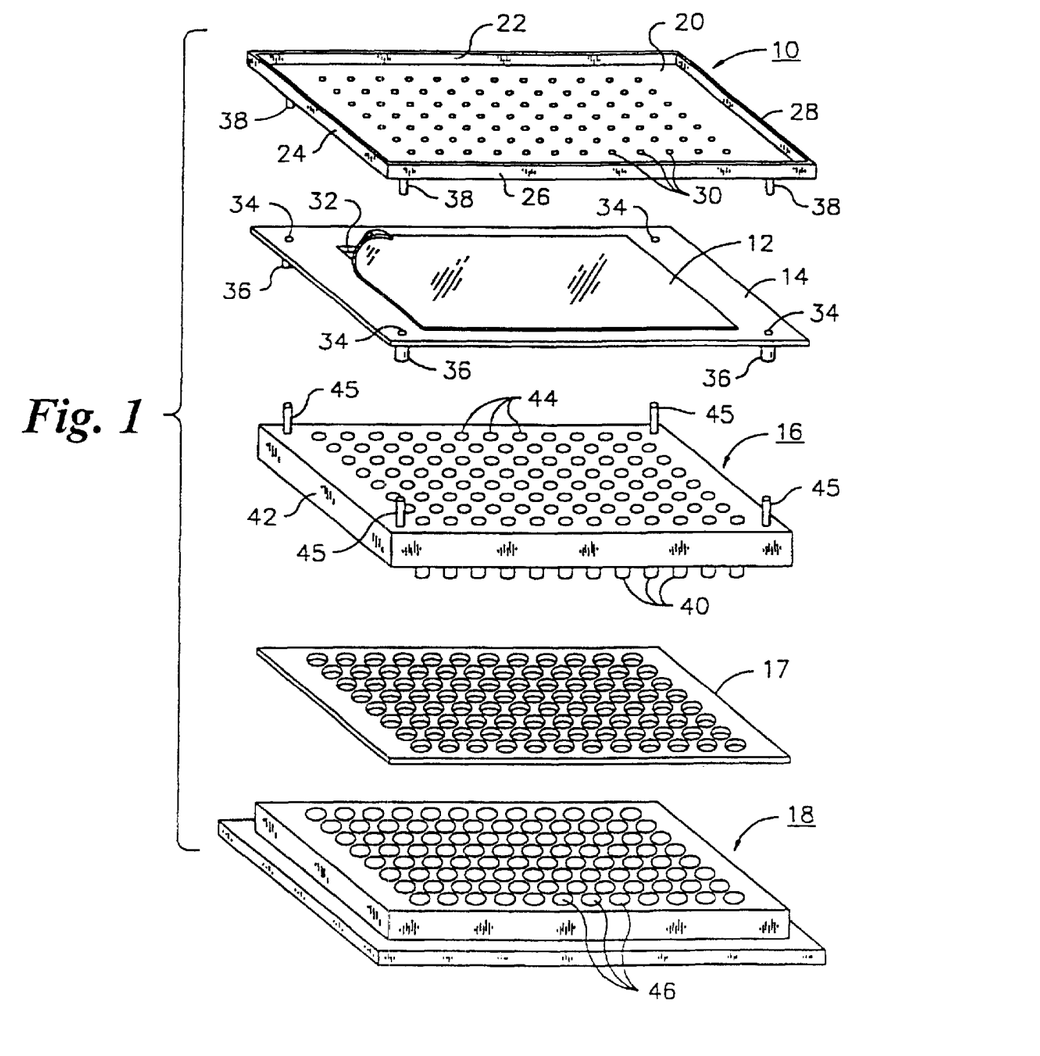
FIG. 1 is an exploded perspective view illustrating a first embodiment of the invention.

FIG. 1 shows the several components needed to carry out the arraying process in accordance with a first embodiment of the invention. These components include a mask 10 with side walls, an adhesive-coated film 12, a capillary array 16, a gasket 17, and a chemically resistant well plate 18.

The mask 10 is a rigid element, preferably made from stainless steel so that it is chemically inert and can be electrically grounded to avoid the accumulation of a static electrical charge which could have an attractive or repulsive effect on the beads. The mask is preferably in the form of a tray having a floor 20 and side walls 22, 24, 26 and 28 extending above the upper surface of the floor 20. The floor of the tray is provided with an array of circular, cylindrical apertures 30, extending from the top face (the inside of the tray) to the bottom face (the underside of the tray). In the illustrated mask, ninety six such apertures are provided, in a regular pattern having twelve columns and eight rows. This pattern corresponds to the pattern of a conventional, ninety six well, microtiter plate. The centers of adjacent apertures are spaced from each other by the same distance by which the centers of adjacent wells are spaced from each other, typically 0.9 cm. Other patterns of apertures can be used. For example 384 apertures can be arranged in a 16×24 array, 864 apertures can be arranged in a 24×36 array, and 1,536 apertures can be arranged in a 32×48 array.

The beads in a given mixture to be arrayed should be substantially uniform in size, preferably within a range of ±20% of a nominal bead diameter. The apertures are preferably circular, and of uniform size. Their diameter depends on the size of the beads to be arrayed. In order for the arraying apparatus to deposit single beads properly, the diameters of the apertures should be in the range of approximately 1.1 to 1.9 bead diameters. Noticeably improved results can be achieved when the diameters of the apertures are in the range of 1.25 to 1.75 bead diameters. Optimization of the aperture size, cross-sectional geometry and array geometry may be carried out empirically with the objective of achieving reliable deposition of a single bead at each array point. For most applications, the optimum aperture diameter is approximately 1.3 bead diameters.

To ensure that a bead enters each aperture in the mask reliably, it is important that the apertures be flush with the top face of the mask. Otherwise, burrs and other irregularities extending upwardly from the top face may interfere with the movement of the beads into one or more of the apertures. When fabricating a mask for arraying single beads, it is also important to machine the holes in such a way as to make sure that the openings of the apertures are regular circles. When fabricating a mask for multiple beads, the apertures can be of various shapes other than circular, for example oval. The openings of the apertures at the underside of the mask should also be flush with the bottom face and regular so that no burrs or other irregularities interfere with the application of the adhesive layer to the underside of the mask, or with the initial attachment of the beads to the adhesive layer. The apertures, which are typically 350 $\mu$m (0.350 mm) in diameter for a 270 $\mu$m bead size, can be formed by precision drilling, or by any of various known micro-machining techniques, including laser drilling, etching, etc.

The adhesive-coated film 12 is applied to the underside of the mask in such a way that tight contact is made with the bottom surface of the mask and with the perimeter of the bottom opening of each aperture. A preferred material for the film is nitrocellulose, which has the advantage that it is porous, so that a solvent for dislodging the beads from the adhesive layer will pass through it readily. The film may be either rigid or flexible. The film 12 may be mechanically clamped to the underside of the mask by a frame 14 having a rectangular central opening 32. The frame is provided with guide holes 24, which extend into bosses 36 projecting from the underside of the frame. The guide holes receive pins 38, which are affixed to the underside of the mask. The guide holes and pins ensure that, when the film is removed from the mask, it can be positioned in relation to the capillary array 16 so that the beads adhering to the adhesive layer on the film are aligned with the openings of the capillaries. In the case of a rigid film, the frame can be eliminated, and the corners of the rigid film can be provided with guide holes to facilitate alignment of the film with the capillary array. In another alternative embodiment, which will be described with reference to FIG. 6, the mask and the adhesive layer remain attached to each other, and the sidewalls of the mask fit tightly over the sides of the capillary array so that the apertures in the mask are accurately aligned with the upper ends of the capillaries.

The upper side of the adhesive-coated film 12, as seen in FIG. 1, is coated with a suitable adhesive to present a sticky surface to which the beads may attach. The adhesive should be readily soluble in a bead-compatible solvent and easy to remove from the beads. In the case of a polystyrene bead and a nitrocellulose film, ethylene glycol has been found to be a suitable adhesive because it can be removed readily by washing with methanol, and both ethylene glycol and methanol are compatible with analytical procedures using mass spectrometry.

The adhesive must be exposed on the side of the film to which the beads are to attach. However, the adhesive layer need not be a discrete layer. For example, in the case of ethylene glycol on a porous nitrocellulose film, the nitrocellulose film should be minimally saturated with ethylene glycol. That is, the ethylene glycol can be made to permeate the entire film by soaking the film and thereafter removing excess ethylene glycol by pressing the film against absorbent surfaces or allowing the excess to flow off the film or evaporate or by using centrifugation.

The capillary array 16 comprises a set of glass capillaries 40 fixed in a PTFE supporting block 42. Optionally, the top of the capillaries may be flared and the capillaries may be removably seated in the block 42. The capillaries are disposed in an array of rows and columns corresponding to the apertures in the mask. They have openings 44 in the upper surface of the block 42. These openings are large enough to allow beads to enter the capillaries. Openings are also provided at the lower ends of the capillaries, but the openings at the lower ends are small enough that the beads cannot pass through them. The lower portions of the capillaries project downward from the underside of block 42. Guide pins 45 extend upwardly from the corners of the block.

The well plate 18 is a conventional well plate of PTFE or other suitable chemically resistant material, with an array of wells 46 corresponding to the arrays of openings in the mask and capillaries. The wells are capable of receiving the lower potions of the capillaries. Preferably, the capillaries extend below block 42 bythe bottoms of the wells when block 42 rests on top of the well plate 18.

Figure 2:
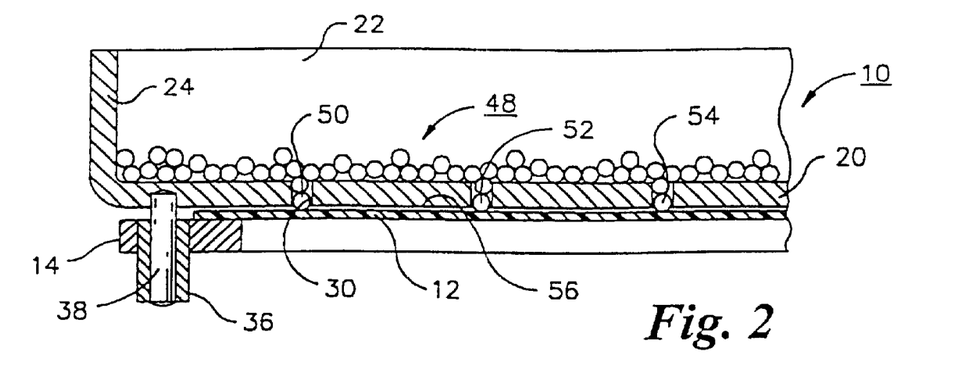
FIG. 2 is a fragmentary sectional view of an assembly consisting of a mask and adhesive-coated film, illustrating a step in the array process.

To carry the bead library, the mask 10 and the frame 14 with the adhesive-coated film are assembled as shown in FIG. 2, with alignment pins 38 on the underside of the mask inserted into the guide holes in bosses 36. Dry beads 48 are poured onto the top face of the floor 20 of the mask. The assembly consisting of the mask, the frame and the adhesive-coated film is then agitated gently so that the beads cover the entire top surface of the mask floor. Beads will fall into the apertures 30 of the mask. For example, beads 50, 52 dn 54 in FIG. 2 are shown in apertures 30. Since the diameter of the apertures is less than twice the diameter of the beads, only one bead can fit into each aperture, it is not possible for two or more beads to fit abreast of one another in a given aperture.

The beads that fall into the apertures of the mask contact an adhesive layer 56 on film 12. When the beads contact the adhesive, they become entrapped. The mask ensures that only one bead can contact the adhesive in each aperture.

With the adhesive-coated film 12 still attached to the mask, the mask in inverted, and excess beads are poured off. Any beads not in the apertures, but tending to remain attached to the mask are removed by gently tapping the mask.

Figure 3:
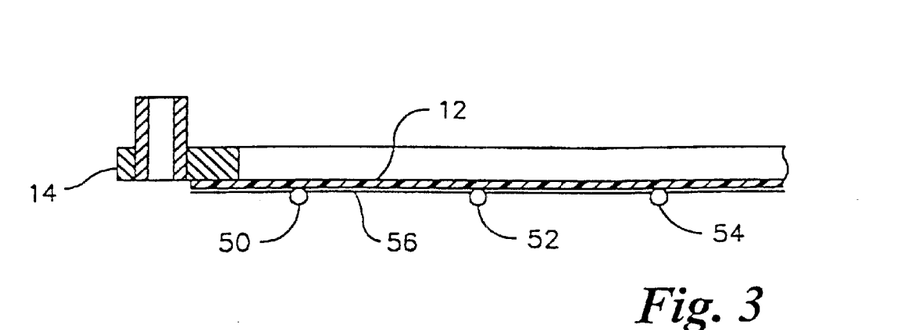
FIG. 3 is a fragmentary sectional view of an assembly consisting of the adhesive-coated film with beads adhering to the adhesive layer, illustrating a further step in the arraying process.
Figure 4:
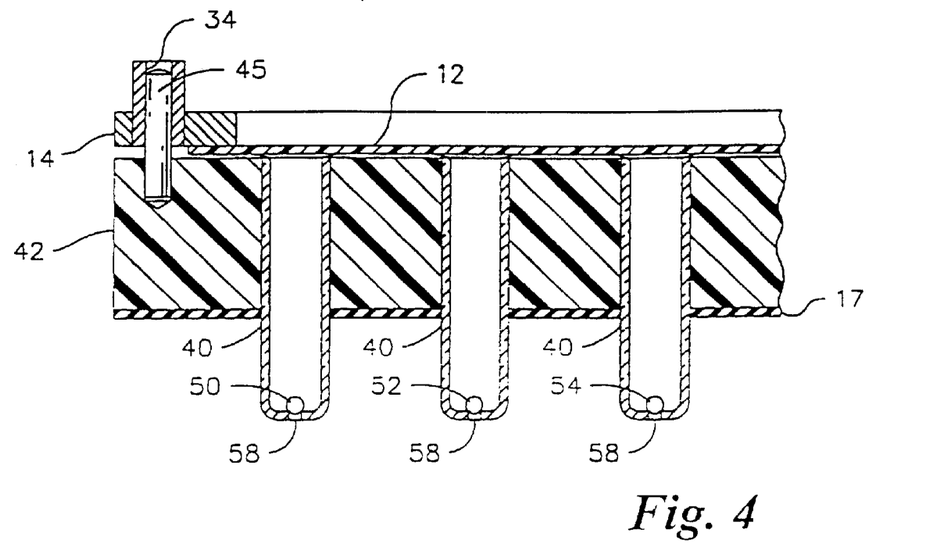
FIG. 4 is a fragmentary sectional view of an assembly consisting of the film and an array of capillary tubes used as receptacles for beads released from the adhesive layer on the film, illustrating a further step in the arraying process.

The frame 14, along with the adhesive-coated film and the beads adhering to it, is detached from the mask, inverted as shown in FIG. 3, and attached to the capillary supporting block 42 shown in FIG. 4, with pins 45 of the capillary block fitting into the holes 34 to ensure alignment of the attached beads with the capillaries.

A solvent, for example a mixture consisting of 50% methanol and 50% water, is applied to the upper surface of the film 12. The solvent passes through the pores of the film and dissolves the adhesive, thereby releasing the beads into the capillaries as shown in FIG. 4. The beads remain in the capillaries because the bottom openings 58 of the capillaries are smaller than the beads. Optionally the release process may be aided by centrifugation of the entire assembly.

Figure 5:
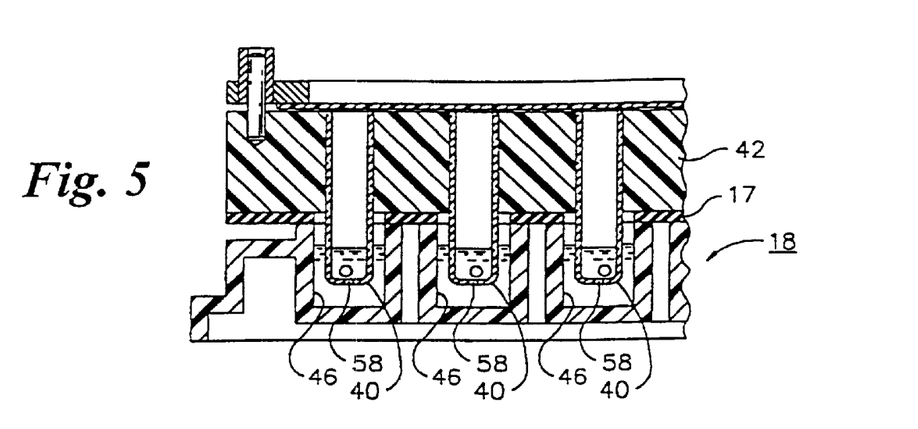
FIG. 5 is a fragmentary sectional view showing capillary tubes inserted into wells in a well plate for cleaving of the compounds carried by the beads.

Cleaving of the compounds of interest from the beads is carried out by placing the capillary block onto the well plate so that the capillaries enter the wells as shown in FIG. 5. The gasket built into the capillary block provides a seal. Each well 46 contains a cleavage reagent, for example an acid cleavage reagent such as trifluoracetic acid, or a base cleavage reagent such as triethylamine or hydrazine. Solvents such as methylene chloride or methanol may be included to cause the beads to swell, thereby opening the pores of the beads. These additives also serve to dissolve the compounds that are released by the cleavage reagent. Dimethyl sulfide may also be included as a carbocation scavenger to prevent reattachment of compounds to the beads. To retard evaporation of the cleavage reagent, a chemically resistant gasket and glass plate (not shown in FIG. 5) may be placed over the upper ends of the capillaries.

The liquid in the wells 46 passes through the openings 58 at the lower ends of the capillaries and comes into contact with the beads. After a time, the compounds cleaved from the beads diffuse into the liquid in the wells. The capillary block can then be removed, so that testing can be carried out on the compounds in the wells.

The reason for the use of the capillaries is that when the beads remain in prolonged contact with the cleavage reagent the cleaved compounds have a tendency to reattach themselves to the beads. The capillaries make it possible to remove the beads from the cleavage reagent and thereby prevent attachment. In cases where the compounds can be tested while attached to the beads, or where reattachment can be avoided by other techniques, the beads can be released from the adhesive-coated film directly into wells in a well plate.

The capillaries provide the further option of using the apparatus for compound synthesis. Synthesis can be carried out by arraying blank beads, or beads carrying a common precursor compound, into capillaries using the method described above. The reagents for the synthesis are dispensed into a series of multi-well plates, preferably by a robotic dispenser. Compounds are assembled by introducing the capillary array containing the beads into the reagent plates. Optionally, the reagent plates can be heated or cooled to control reaction temperature. The capillaries may be sealed at the top to prevent evaporation by clamping a chemically resistant plate over the top of the array. Optionally, the plate may be proved with a gas port to introduce either gaseous reagents or an inert atmosphere to the beads via the capillaries. Reagent plates may optionally be sealed with a chemically resistant membrane which can be punctured by the capillaries during placement of the capillary array over the plate. Successive reaction steps are accomplished by transferring the capillary array from one reagent plate to another, with optional intervening wash steps.

Figure 6:
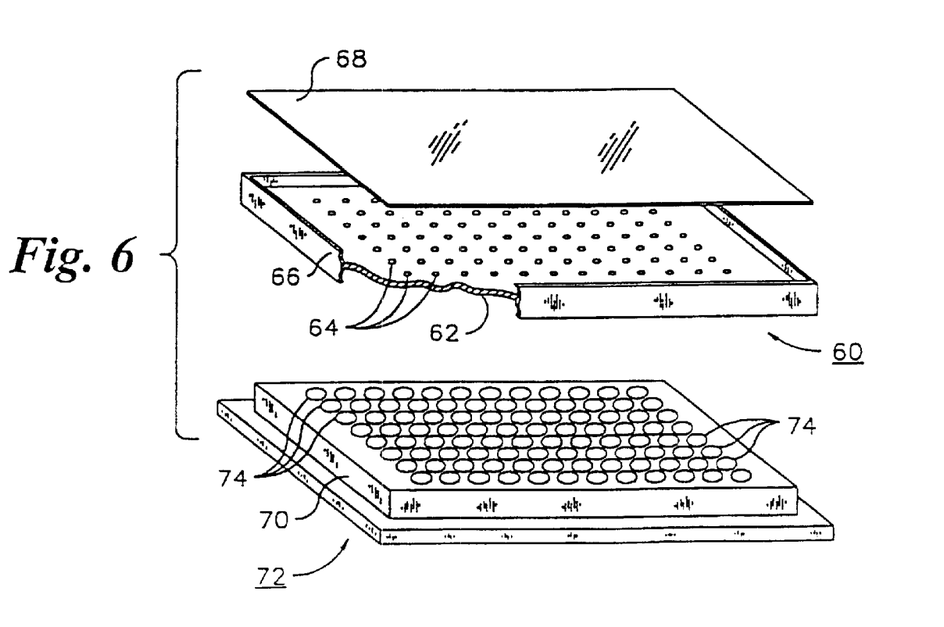
FIG. 6 is an exploded perspective view illustrating an alternative embodiment of the invention.

In the embodiment shown in FIG. 6, for arraying and subsequent cleavage of beads, a mask 60 comprises a floor 62 with an array of apertures 64. Sidewalls 66 extend both upwardly and downwardly from the floor 62. The upwardly extending parts of the sidewalls, together with the floor 62, form a tray to receive a sheet 68 of porous nitrocellulose film, which is coated with an adhesive, for example ethylene glycol. This tray also serves to hold a solvent for dissolving the adhesive. The downwardly extending parts of the sidewalls also cooperate with the floor of the mask to form a tray for holding beads. These same downwardly extending parts of the sidewalls form a recess receiving the upper portion 70 of a well plate 72. This recess conforms to portion 70 of the well plate and ensures that the apertures 64 of the mask are aligned with the wells 74.

In arraying beads using the apparatus of FIG. 6, the sheet 68 of adhesive-coated film is placed on the upper surface of the mask so that the adhesive is in contact with the upper surface. The mask is then inverted and beads are placed onto the mask. By agitation of the beads and/or the mask, beads are caused to enter the apertures and come into contact with the adhesive layer. The mask is then inverted once again and excess beads are removed. After the excess beads are removed, the mask is fitted onto the well plate, and a solvent, such as a mixture consisting of 50% methanol and 50% water, is poured onto the film in the upper part of the mask. The solvent passes through the pores of the film and dissolves the adhesive, thereby releasing the beads into the wells 74. To expedite the passage of the solvent through the porous film, the assembly consisting of the mask 60, the sheet 68 and the well plate may be placed on a vacuum manifold or in a centrifuge. The beads are released into the wells of the well plate and cleavage of the compounds carried by the beads, and subsequent testing steps may be carried out into the wells.

In an alternative embodiment (not illustrated), the mask 60 can be used in conjunction with a capillary block of the kind illustrated in FIGS. 4 and 5. In this embodiment, the downwardly extending walls of the mask also serve to align the mask with the capillary block.

In experiments carried out to determine the effectiveness of the above-described process, polystyrene beads having a diameter of 270 $\mu$m were arrayed using a 96 aperture, stainless steel mask having apertures with a diameter of 350 $\mu$m. Beads were reliably received in all of the apertures. When the adhesive-coated film was removed, 94 of the array points had a single bead, one had two beads and one had no beads.

As mentioned previously, instead of using an apertured mask to establish a pattern of adhesive bead-attachment areas, it is possible to achieve the same objective by applying individual droplets of adhesive to a substrate by using, for example, a dispense of the type used in ink-jet printing.

Figure 7:
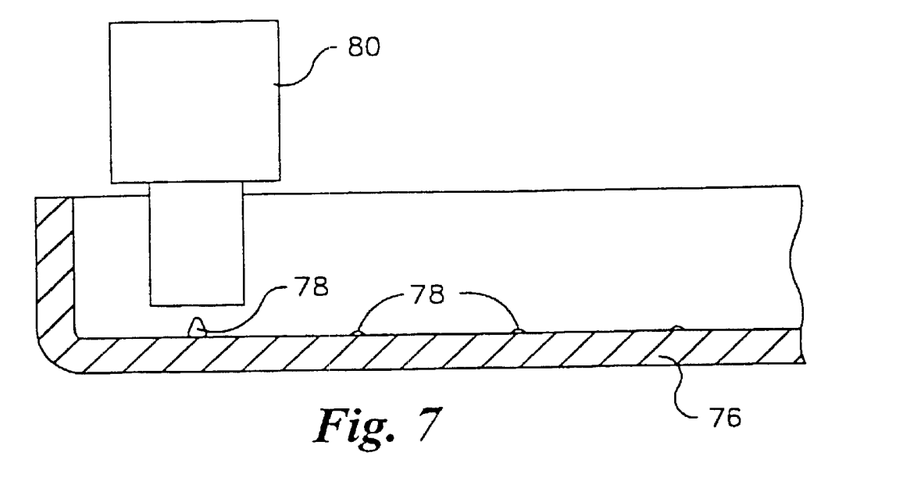
FIG. 7 is a fragmentary sectional view illustrating the deposition of a microscopic adhesive droplet onto a substrate in accordance with still another embodiment of the invention.

As shown in FIG. 7, in which a stainless steel trays 76 serves as a substrate, droplets 78 of an adhesive such as ethylene glycol are deposited in a predetermined pattern by means of a piezoelectric dispenser 80. The dispenser 80 is movable in two dimensions in a plane above the surface of tray 76 by a conventional x-y plotter drive or similar mechanism. The dispenser head is a head of the kind used in ink jet printing, and, although not shown in detail, it typically comprises a glass capillary tube having a bonded ceramic collar. When a voltage is applied to the ceramic collar, the collar contracts, expelling extremely small droplets from the glass capillary. Droplets as small as 0.2 nanoliters have been dispensed reliably. For the purpose of this invention, a typical adhesive droplet of about one nanoliter is generally adequate to capture and individual bead.

Figure 8:
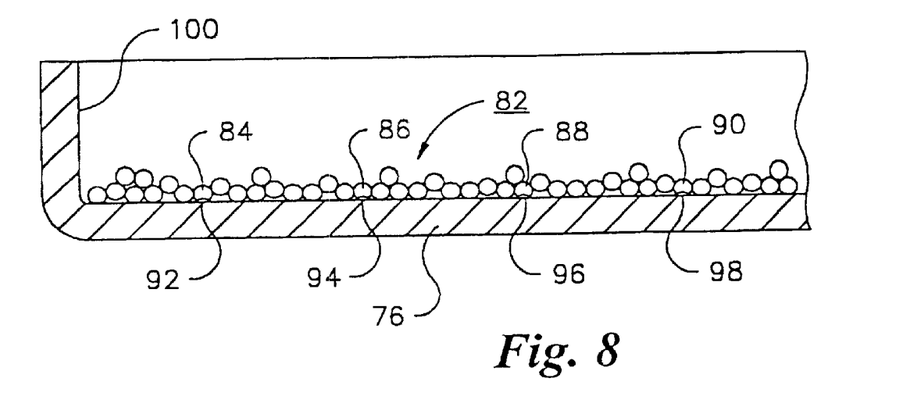
FIG. 8 is a fragmentary sectional view showing a quantity of beads on the substrate, some of the beads being in contact with the deposited adhesive droplets.

After the pattern of adhesive droplets is established on the surface of tray 76, a quantity of beads 82 is placed onto the surface of the tray, as shown in FIG. 8. The beads are agitated, either by movement of the tray, or by other means, for example a stream of air. The agitation ensures that each adhesive droplet has attached to it a single bead, or if the droplet is larger, a predetermined number of beads greater than one. As shown in FIG. 8, beads 84, 86, 88 and 90 are attached to droplets 92, 94, 96 and 98 respectively. The sidewall 100 of the tray retains the beads.

Figure 9:
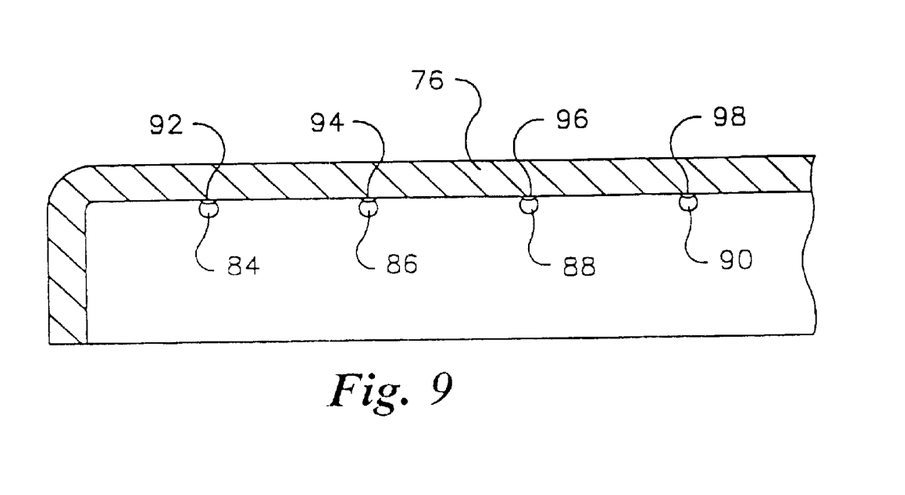
FIG. 9 is a fragmentary sectional view of the same substrate after the removal of excess beads.

After the beads are agitated and each adhesive droplet has the desired number of beads attached to it, the tray is inverted, as shown in FIG. 9, and the excess beads are poured off, leaving only the attached beads in a pattern corresponding to the pattern in which the adhesive droplets were laid out.

Figure 10:
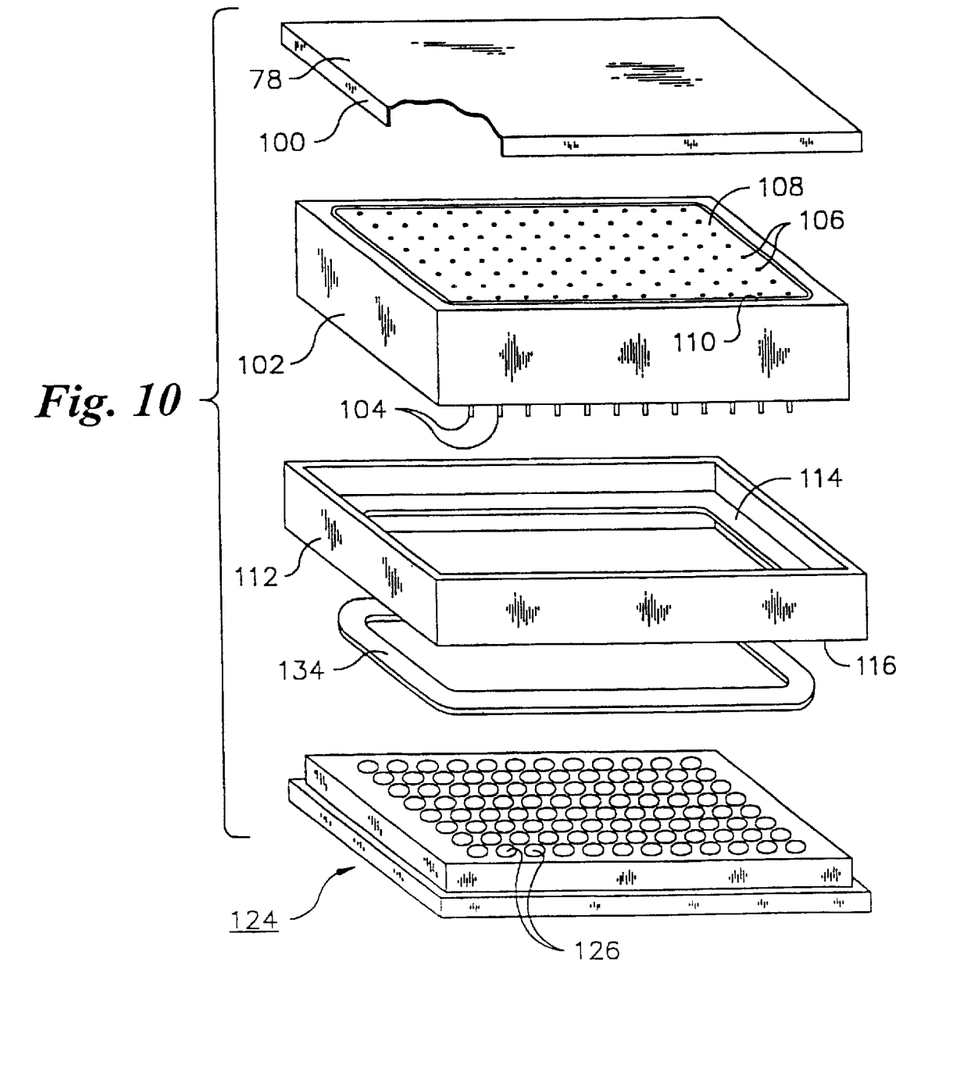
FIG. 10 is an exploded view showing an assembly for depositing the beads from the substrate of FIG. 9 into an array of capillaries, and for immersing the beads, in the array of capillaries, in reagent-containing wells.

As shown in FIG. 10, tray 78 fits over a PTFE block 102, which supports a set of glass capillary tubes 104. The upper ends 106 of the capillary tubes are flush with the upper surface 108 of the block, and arranged in a pattern corresponding to the patter of adhesive droplets on the tray in FIG. 7. The upper ends of the set of capillaries are surrounded by a chemically resistant elastomeric seal 110, which contacts the tray 78 when it is placed over the block.

The block 102 fits into a rectangular supporting frame 112, having a shelf 114 extending around its inner walls. The upper surface of the shelf is spaced from the lower edge 116 of the frame by a distance greater than the distance by which the capillary tubes project below the lower face of block 102. Thus, when the block is received in the frame, the capillaries are protected from damage.

Figure 11:
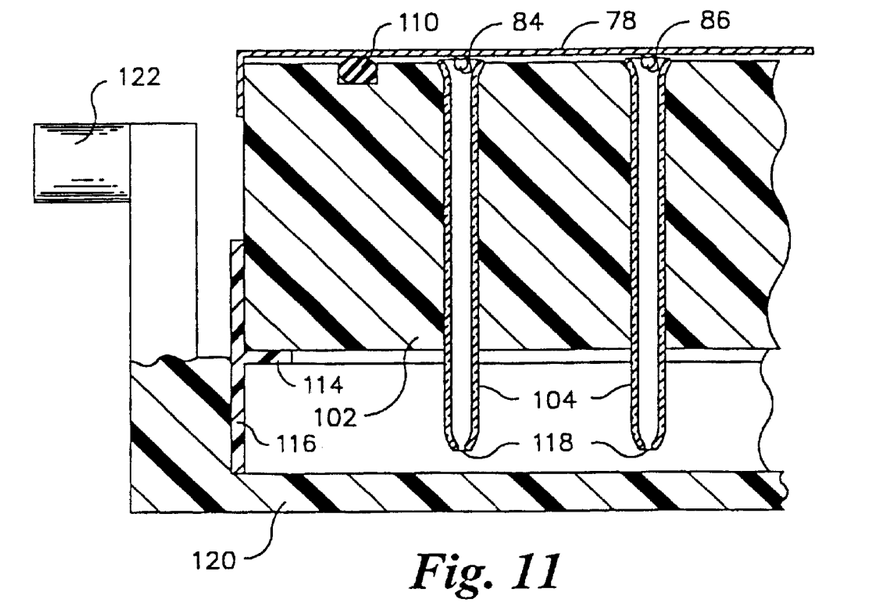
FIG. 11 is a fragmentary sectional view showing the capillary array of FIG. 10 in a vacuum centrifuge, used to release beads from the substrate into the capillaries.

As shown in FIG. 11, the upper ends of the capillary tubes 104 are flared so that they are retained in block 102, and also to allow some tolerance in the alignment of the beads (e.g. 84 and 86) with the capillary tubes. The lower ends of the capillary tubes have small openings 118, which are smaller that the beads.

The assembly comprising block 102, tray 78 and frame 116 is placed on a holder 120 of a vacuum centriguge, the holder being pivotally supported by trunnions, one of which is seen at 122. Preferably other similar assemblies are simultaneously placed on other holders in the centrifuge for balance. Operation of the centrifuge causes the adhesive droplets to evaporate and the beads to move to the lower ends of the capillary tubes. No solvent is needed to remove the beads from the tray, and consequently it is not necessary of the tray to be porous. Removal of the beads from the adhesive droplets can be accomplished in minutes by applying a high vacuum at an elevated temperature (e.g. 65° C.). Under these conditions in a centrifuge, the beads can be transferred directly into the capillary tubes. It is, of course, possible to effect removal of the beads from the adhesive droplets by using a solvent, in which case a tray having a porous floor may be used.

Figure 12:
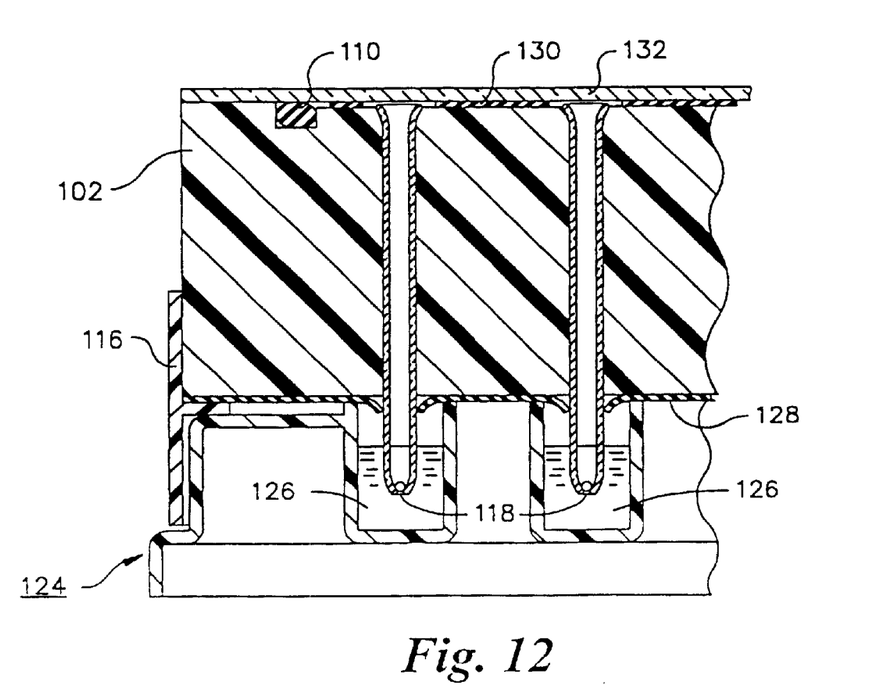
FIG. 12 is another fragmentary sectional view, showing capillaries, containing beads, immersed in reagent-containing wells.

As shown in FIG. 12, the block 102, with its capillary tubes each containing a bead, is placed on a well plate 124 so that the lower ends of the capillary tubes are immersed in reagent in the wells 126. The well plate is also shown in FIG. 10. The downwardly extending parts of the walls of frame 116 serve to align the block with the well plate so that the capillary tubes enter the wells. Reagent enters the capillaries through their openings 118 for contact with the beads.

While, for cleaving of compounds from the beads, it is not ordinarily necessary to seal the capillaries, in the case of synthesis of compounds on the beads, seals may be provided to isolate the reactions from one another. Thus, as shown in FIG. 12, an elastomeric sheet 128 is provided between the underside of the block and the upper surface of the well plate. The sheet 128 is preferably a chemically resistant fluroelastomer such as the material available under the trademark VITON. The sheet 128 is provided with perforations which are penetrated by the capillary tubes as they enter the wells. The edges of the perforations engage the capillary tubes and provide a seal preventing liquids and vapors from each well from entering adjacent wells. At the upper surface of the block 102, a VITON gasket 130 is provided underneath a glass plate 132, which also engages seal 110. The gasket and glass plate isolate the upper ends of the capillary tubes from one another. The assembly can be heated, where desirable, depending on the nature of the reactions taking place. Ports (not shown) can be provided in the glass plate 132 for the introduction of gases or an inert atmosphere.

In the case of cleaving of compounds, the isolation of the wells and capillary tubes is normally unnecessary, and thus the glass plate and VITON sheets can be omitted ed between the block 102 and the well plate 124, as shown in FIG. 10.

When using droplets of adhesive to capture single beads, the droplets are typically in the range of 1–2 nanoliters so that the diameter of each adhesive droplet is less than the diameter of a bead. Thus, only one bead is captured at any given location within the array. If more than one bead is desired at an array position, the volume of the dispensed adhesive can be increased.

Figure 13:
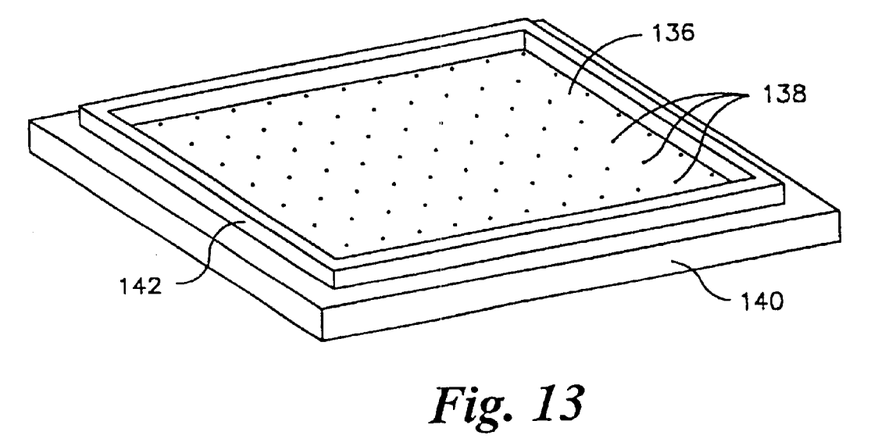
FIG. 13 is a perspective view showing an alternative form of mask.
Figure 14:
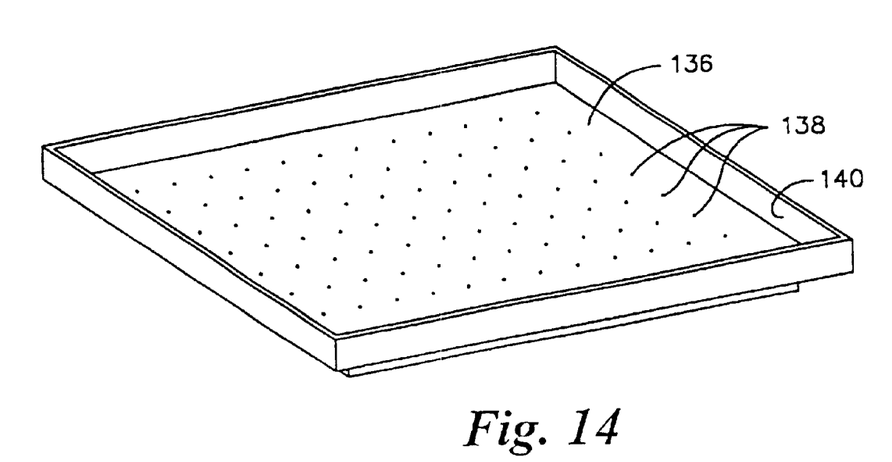
FIG. 14 is a perspective view showing the underside of the mask of FIG. 13.

FIGS. 13 and 14 shown an alternative form of mask in which a stainless steel floor 136, having a pattern of apertures 138, has a side wall 140 extending perpendicularly from one face and adapted to fit over block 102 (FIG. 10) in such as way as to align the apertures 138 with the openings at the upper ends of the capillary tubes. On the other side of the floor a wall 142 is provided to receive a porous adhesive-coated sheet, and to retain a solvent, e.g. a mixture consisting of 50% methanol and 50% water, for releasing beads from the sheet.

As will be apparent from the above description, the invention allows beads to be deposited rapidly and reliably in a desired geometric tray. It is simple, inexpensive and easy to use, especially in comparison to prior techniques, which were generally more complex, slower and less reliable. The invention allows compounds to be synthesized in an array format and released for evaluation, thus it has the capability to accommodate either split-synthesis protocols with bulk beads, or directed arrays of compounds with known synthetic histories.

Various modifications can be made to the apparatus and process described.

For example, although a porous nitrocellulose film is preferred, other materials, such as PTFE (polytetrafluoroethylene), porous nylon and PVDF (polyvinylidene difluoride) films may be used.

Although a porous nitrocellulose film minimally saturated with ethylene glycol is preferred, it is possible to provide the adhesive in a discrete layer on a porous or non-porous film.

Various alternative adhesives, such as DMSO and glycerol, may be used, although glycerol is somewhat less satisfactorily because it is deliquescent.

Instead of using cleavage reagents such as trifluoracetic acid, triethylamine or hydrazine, alternative methods such as photo cleavage can be used to remove the compounds of interest from the beads.

In carrying out the arraying process, it is possible to release the beads from the adhesive layer or droplets by applying the solvent directly to the side of the surface to which the beads are attached. This may be done by placing the surface, with the beads attached to it, against the top surface of a well plate in which the wells contain the solvent, and then inverting the well plate and film together so that the solvent can contact the adhesive and thereby release the beads. In another modification, where it is desired to deposit multiple beads at each location in the array, the apertures in the mask can be of a size such that each one accommodates a predetermined number of beads, greater than one abreast. The apertures can be of various shapes other than circular, for example oval.

Whereas the embodiments described herein utilize planar bead attachment surfaces, it is possible to use non-planar surfaces such as cylindrical masks. For example, a cylindrical surface formed into a rotating drum will end itself to continuous, automated operation. It is also possible to compartmentalize the surface by partitions so that different sublibraries can be located in discrete areas of the array.

In a further embodiment of the invention, the mask can be provided with apertures of a size less than that of the smallest bead to be arrayed, and attached to a plenum chamber on which a vacuum is drawn to trap the beads against the apertures by air pressure. The apertures can be tapered so that the smallest diameter of the aperture is smaller than that of the smallest bead, and the entrance is larger than the largest bead. Using this technique, a range of bead sizes can be accommodated. Beads are deposited into receptacles by releasing the vacuum, thereby equalizing the pressure on both sides of the mask.

Still other modifications can be made to the apparatus and process described without departing from the scope of the invention as defined in the following claims.

What is claimed is:

1. A process for arraying beads for bead-based combinatorial libraries which comprises:

establishing a bead-receiving surface comprising a pattern of discrete bead attachment areas, wherein each discrete bead attachment area is an area of adhesive on a porous substrate, each bead attachment area being capable of holding a limited number of beads of uniform size, and an area, from which beads are free to separate, spacing the discrete bead attachment areas from one another, the limited number of beads for each bead attachment area being the same as that for every other bead attachment area in the pattern;

placing a mixture of beads of uniform size onto the surface;

causing a predetermined number of beads from the mixture to attach to each of the discrete bead attachment areas;

removing from the surface beads which are not attached to the discrete bead attachment areas; and thereafter releasing the attached beads from the discrete bead attachment areas by washing the porous substrate with a solvent and thereby dissolving the bead attachment areas, and depositing them in an array of receptacles.

2. The process according to claim 1 in which the step of releasing the attached beads is preceded by the steps of aligning the attached beads with receptacles in said array of receptacles corresponding to the pattern of bead attachment areas, the depositing step is carried out by washing the beads into the receptacles with which they are aligned, and the depositing step is followed by the step of cleaving a compound from each bead by means of a reagent, while the beads remain in the receptacles.

3. The process according to claim 1 in which the step of releasing the attached beads is preceded by the steps of aligning the attached beads with capillaries in an array of capillaries corresponding to the pattern of bead attachment areas, the depositing step is carried out by washing the beads into the capillaries with which they are aligned, and the depositing step is followed by the step of introducing the capillaries, containing beads, into wells each containing a reagent, and cleaving compounds from the beads by means of the reagents in the wells, while the beads remain in the capillaries.

4. A process for synthesizing arrays of chemical compounds which comprises:

establishing a bead-receiving surface comprising a pattern of discrete bead attachment areas, each bead attachment area being capable of holding a limited number of beads of uniform size, and an area, from which beads are free to separate, spacing the discrete bead attachment areas from one another; the limited number of beads for each bead attachment area being the same as that for every other bead attachment area in the pattern;

placing a mixture of beads of uniform size onto the surface;

causing a predetermined number of beads from the mixture to attach to each of the discrete bead attachment areas;

removing from the surface beads which are not attached to the discrete bead attachment areas;

aligning the attached beads with capillaries in an array of capillaries corresponding to the pattern of bead attachment areas;

releasing the attached beads from the discrete bead attachment areas and depositing them into the array of capillaries; and introducing the array of capillaries into wells containing reagents for desired synthetic steps and carrying out syntheses on the beads while the beads are in the capillaries.

5. The process according to claim 1 in which the step of carrying out syntheses on the beads is followed by washing the beads in the capillaries to remove unbound reagents, and cleaving synthesized compounds.

* * * * *